(12) United States Patent
Jacobs (10) Patent No.: US 12,097,681 B2
(45) Date of Patent: Sep. 24, 2024

(54) INTERCELLULAR STRUCTURE FOR BATTERY MODULE

(71) Applicant: Rivian IP Holdings, LLC, Irvine, CA (US)

(72) Inventor: Tyler Jacobs, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 83 days.

(21) Appl. No.: 17/565,136

(22) Filed: Dec. 29, 2021

(65) Prior Publication Data
US 2022/0203645 A1      Jun. 30, 2022

Related U.S. Application Data

(60) Provisional application No. 63/132,131, filed on Dec. 30, 2020.

(51) Int. Cl.
*H01M 50/107* (2021.01)
*B31D 3/02* (2006.01)

(52) U.S. Cl.
CPC ........ *B31D 3/0207* (2013.01); *H01M 50/107* (2021.01)

(58) Field of Classification Search
CPC .......................... B31D 3/0207; H01M 50/107; H01M 50/244; H01M 50/291; H01M 50/00–114; Y02E 60/10
See application file for complete search history.

(56) References Cited

U.S. PATENT DOCUMENTS

2020/0035967 A1\* 1/2020 Yoon ................... H01M 50/213

FOREIGN PATENT DOCUMENTS

| DE | 102008034699 A1 \* | 1/2010 | .......... H01M 10/613 |
|---|---|---|---|
| DE | 102015008264 A1 \* | 1/2016 | |
| EP | 2821219 A1 \* | 1/2015 | ......... B29D 99/0089 |
| WO | WO-2019028511 A1 \* | 2/2019 | |
| WO | WO-2020039338 A1 \* | 2/2020 | |

OTHER PUBLICATIONS

Machine translation of DE-102008034699-A1, accessed May 8, 2023 (Year: 2023).\*
Machine translation of DE-102015008264-A1, accessed May 8, 2023 (Year: 2023).\*
"New Lightweight Honeycomb Structure Made With Victrex APTIV Film Fills Performance Gaps, While Enhancing Design Freedom and Reducing Production Costs", PlasticsNet, A Vertmarkets Marketplace for Industry Professional, Apr. 22, 2010, 1 page.

\* cited by examiner

*Primary Examiner* — Milton I Cano
*Assistant Examiner* — Albert Michael Hilton
(74) *Attorney, Agent, or Firm* — HALEY GUILIANO LLP (57) ABSTRACT

An intercellular structure and a battery module including the intercellular structure, and a method of assembling the battery module are provided. The intercellular structure includes a honeycomb structure including a plurality of hexagonal cells. Each of the plurality of hexagonal cells has an open-ended top and an open-ended bottom and is configured to be arranged around a middle section of one of a plurality of battery cells. The battery module includes a plurality of battery cells arranged in a predetermined pattern and the honeycomb structure including the plurality of hexagonal cells.

20 Claims, 9 Drawing Sheets

INTERCELLULAR STRUCTURE FOR BATTERY MODULE

CROSS-REFERENCE TO RELATED APPLICATION

This application claims priority to U.S. Provisional Patent Application No. 63/132,131, filed on Dec. 30, 2020, the entire contents of which are hereby expressly incorporated by reference in their entirety.

INTRODUCTION

The present disclosure is directed to an intercellular structure for a battery module and a method for assembling a battery module, and more particularly to an intercellular structure that provides a heat or fire-resistant barrier between battery cells in a battery module.

SUMMARY

It is advantageous to package battery cells closely in high-voltage, large-format battery modules to provide high energy density battery modules. However, as the number of battery cells in a single battery module increases and the amp hour capacity of individual battery cells increases, the likelihood that a cell casing of one of the battery cells in the battery module will fail (e.g., due to internal battery cell defects) also increases. Accordingly, in some embodiments, it may be advantageous to provide a heat or fire-resistant barrier between cells to reduce or prevent propagation of a thermal event from one cell to other adjacent cells. Additionally, in some embodiments, it would be advantageous to provide additional structural support to individual battery cells in a battery module to increase the rigidity of the battery module.

To solve one or more of these problems, an intercellular structure and a battery module including the intercellular structure, and a method of assembling the battery module are provided. The intercellular structure includes a honeycomb structure including a plurality of hexagonal cells. Each of the plurality of hexagonal cells has an open-ended top and an open-ended bottom, and each of the plurality of hexagonal cells is configured to be arranged around a middle section of one of a plurality of battery cells.

In some embodiments, the plurality of battery cells may be arranged in a close-hex-pack configuration.

In some embodiments, edges of the honeycomb structure may form a rectangular shape.

In some embodiments, the honeycomb structure further may further include a plurality of partial hexagonal cells forming a first edge of the rectangular shape. In some embodiments, each of the plurality of partial hexagonal cells may include fewer than five sidewall portions arranged in a partial hexagon shape, and each of the plurality of partial hexagonal cells has an open-ended top and open-ended bottom and may be configured to be arranged around a portion of middle section of one of the plurality of battery cells.

In some embodiments, vertices of each of the plurality of hexagonal cells may be rounded.

In some embodiments, the honeycomb structure may include a meta-aramid fiber material or a ceramic fiber paper material.

In some embodiments, the honeycomb structure may include a plastic material, a rubber material, a silicone material, or a metal material.

In some embodiments, the honeycomb structure may include a plurality of individual segments, and each one of a subset of the plurality of hexagonal cells may be formed by a pair of segments, of the plurality of individual segments, arranged next to each other.

In some embodiments, the plurality of battery cells may include a first group of cylindrical battery cells and a second group of cylindrical battery cells;

In some embodiments, the honeycomb structure may include a first honeycomb structure and a second honeycomb structure, the first honeycomb structure and the second honeycomb structure being separate structures. In some embodiments, the first honeycomb structure may include a first plurality of hexagonal cells, each configured to be arranged around a cylindrical middle section of one of the first group of cylindrical battery cells. In some embodiments, the second honeycomb structure may include a second plurality of hexagonal cells, each configured to be arranged around a middle section of one of the second group of cylindrical battery cells.

In some embodiments, each of the first group of cylindrical battery cells may be connected in parallel with each other, each of the second group of cylindrical battery cells may be connected in parallel with each other, and the first group of cylindrical battery cells may be separated from the second group of cylindrical battery cells by a barrier layer.

In some embodiments, a battery module is provided. The battery module includes a plurality of battery cells arranged in a predetermined pattern and a honeycomb structure including a plurality of hexagonal cells. Each of the plurality of hexagonal cells has an open-ended top and an open-ended bottom, and each of the plurality of hexagonal cells is configured to be arranged around a middle section of one of a plurality of battery cells.

In some embodiments, the predetermined pattern may be a close-hex-pack configuration.

In some embodiments, edges of the honeycomb structure may form a rectangular shape.

In some embodiments, the honeycomb structure may further include a plurality of partial hexagonal cells forming a first edge of the rectangular shape. In some embodiments, each of the plurality of partial hexagonal cells may include fewer than five sidewall portions arranged in a partial hexagon shape, and each of the plurality of partial hexagonal cells may have an open-ended top and open-ended bottom and may configured to be arranged around a portion of middle section of one of the plurality of battery cells.

In some embodiments, vertices of each of the plurality of hexagonal cells may be rounded.

In some embodiments, the plurality of battery cells may include a first group of cylindrical battery cells and a second group of cylindrical battery cells. In some embodiments, the honeycomb structure may include a first honeycomb structure and a second honeycomb structure, the first honeycomb structure and the second honeycomb structure being separate structures. In some embodiments, the first honeycomb structure may include a first plurality of hexagonal cells, each configured to be arranged around a cylindrical middle section of one of the first group of cylindrical battery cells, the second honeycomb structure may include a second plurality of hexagonal cells, each configured to be arranged around a middle section of one of the second group of cylindrical battery cells.

In some embodiments, the battery module may further include a barrier layer. In some embodiments, each of the first group of cylindrical battery cells may be connected in parallel with each other, each of the second group of cylindrical battery cells may be connected in parallel with each other, and the first group of cylindrical battery cells may be separated from the second group of cylindrical battery cells by the barrier layer.

In some embodiments, a method of assembling a battery module is provided. The method includes: providing a plurality of battery cells; arranging the plurality of battery cells into a close-hex-pack configuration; providing a honeycomb structure including a plurality of hexagonal cells, each of the plurality of hexagonal cells having an open-ended top and an open-ended bottom; and arranging each of the plurality of hexagonal cells around a middle section of one of the plurality of battery cells.

In some embodiments, arranging the plurality of battery cells into the close-hex pack configuration may include arranging the plurality of battery cells into the close-hex pack configuration on a first side of a carrier layer.

In some embodiments, the honeycomb structure is formed as a single piece, and arranging each of the plurality of hexagonal cells around the middle section of one of the plurality of battery cells may include inserting the honeycomb structure in free space between the plurality of battery cells from the first side of the carrier layer.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
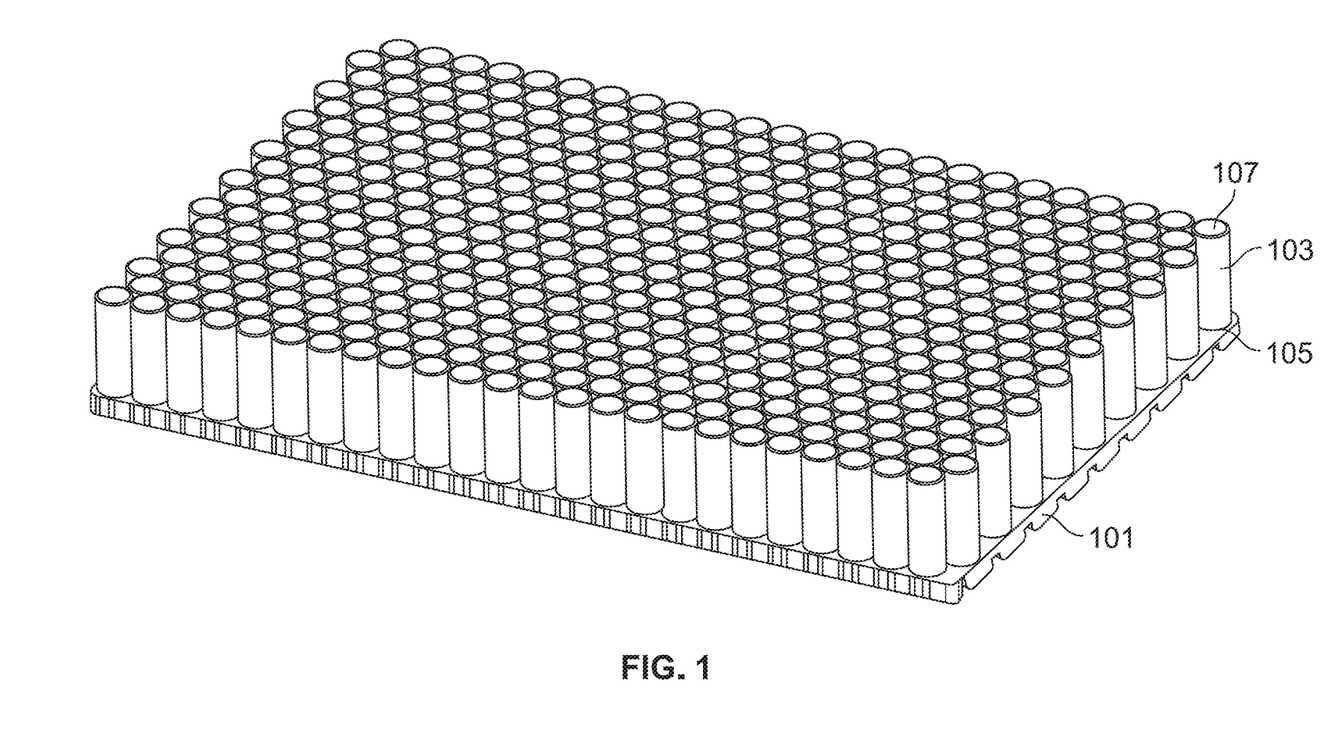
FIG. 1 shows a plurality of battery cells and a carrier layer of a battery module assembly, in accordance with some embodiments of the present disclosure.

FIG. 1 shows a plurality of battery cells 103 and a carrier layer 101 of a battery module assembly, in accordance with some embodiments of the present disclosure. As shown, each of the plurality of battery cells 103 may be cylindrical and may have a first end 105 and a second end 107. In some embodiments, the first end 105 may include a first electric terminal (e.g., a center button terminal). In some embodiments, each of the plurality of battery cells 103 may have an exposed region of electrically-active casing or a conductive jacket that covers at least a portion of the second end 107, at least a portion of the first end 105 and a side of each battery cell 103, forming the second electrical terminal (e.g., a rim terminal). In some embodiments, the first end 105 of each of the plurality of battery cells 103 may be inserted into and coupled to a respective recess (e.g., using an adhesive) on a first side of the carrier layer 101. As shown, the plurality of battery cells 103 may be arranged in a close hexagonal packing (close-hex-pack) configuration (e.g., an arrangement in which each battery cell, excluding battery cells on the edges of the arrangement, is directly adjacent to six other battery cells). In some embodiments, the smallest distance between adjacent ones of the plurality of battery cells 103 is less than approximately 1.5 millimeters.

Figure 2A:
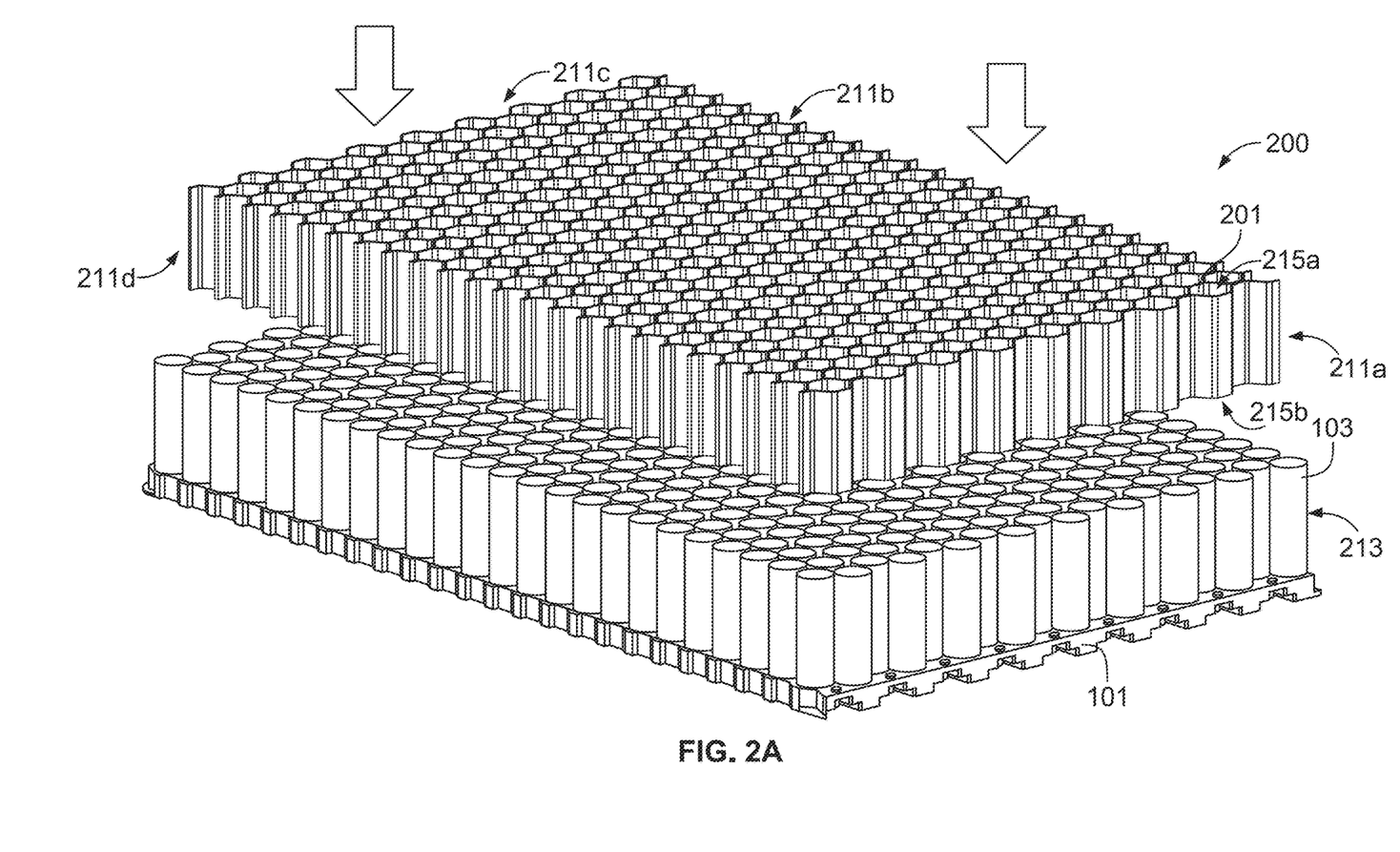
FIG. 2A shows a perspective view of the battery module assembly of FIG. 1, before insertion of a honeycomb structure in the battery module assembly of FIG. 1, in accordance with some embodiments of the present disclosure.
Figure 2B:
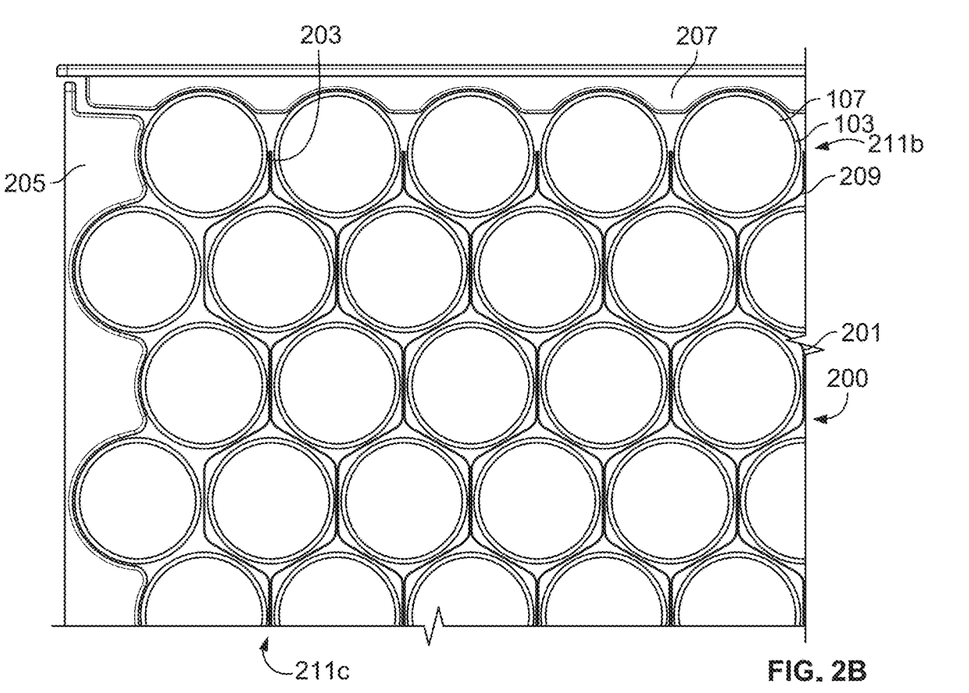
FIG. 2B shows a partial top view of the honeycomb structure of FIG. 2A, after insertion of the honeycomb structure in the battery module assembly of FIG. 1, in accordance with some embodiments of the present disclosure.

FIG. 2A shows a perspective view of the battery module assembly of FIG. 1, before insertion of a honeycomb structure 200 in the battery module assembly of FIG. 1, in accordance with some embodiments of the present disclosure. FIG. 2B shows a partial top view of the honeycomb structure 200 of FIG. 2A, after insertion of the honeycomb structure 200 in the battery module assembly of FIG. 1, in accordance with some embodiments of the present disclosure. The honeycomb structure 200 includes a plurality of hexagonal cells 201 that corresponds to the arrangement of the plurality of battery cells 103. As shown, each of the plurality of hexagonal cells 201 has an open-ended top 215a and an open-ended bottom 215b that allow the honeycomb structure 200 to be inserted in the free space between adjacent ones of the plurality of battery cells 103. In some embodiments, the height of each of the plurality of hexagonal cells 201 may be less than the height of each of the plurality of battery cells 103 so that each of the sidewalls only covers a cylindrical middle section 213 of a corresponding one of the plurality of battery cells 103. For example, the cylindrical middle section 213 of each of the plurality of battery cells 103 may be 80% or less of the entire length of each of the plurality of battery cells 103, and the sidewalls of each of the plurality of hexagonal cells 201 may be substantially centered in this cylindrical middle section 213 so that at least 10% or more of the top and bottom of each of the plurality of battery cells 103 is not covered by the hexagonal cell 201. In some embodiments, depending on the depth of recesses in the carrier layer 101 that each of the plurality of battery cells 103 are inserted into, the hexagonal cells 201 may not be substantially centered in this cylindrical middle section 213. It will be understood that these percentages are merely illustrative and that other relative sizes of battery cells 103 and the hexagonal cells 201 may be used. For example, the cylindrical middle section 213 of each of the plurality of battery cells 103 may be 50% or less, 60% or less, 70% or less, or 90% or less of the entire length of each of the plurality of battery cells 103. In some embodiments, the bottom of the honeycomb structure 200 may contact the carrier layer 101 after being inserted into the battery module.

In some embodiments, the honeycomb structure 200 may comprise a fire-resistant material to prevent a fire from spreading between adjacent battery cells 103 (e.g., when one of the battery cells 103 is undergoing a thermal event). Additionally, depending on the specific requirements of a particular battery module, the honeycomb structure 200 may be a flexible material (e.g., to allow lower tolerance requirements for the battery modules) or stiff material (e.g., to provide additional structural support to individual battery cells 103). For example, the honeycomb structure 200 may be a plastic material, a meta-aramid fiber material (e.g., NOMEX®), a ceramic fiber paper material, a rubber material, a silicone material, a metal material, etc. Depending on the specific requirements of a particular battery module, the required tolerances of the particular battery module, the material of the honeycomb structure 200, etc., the honeycomb structure 200 may be manufactured using a variety of techniques. For example, if the honeycomb structure 200 is a metal, the honeycomb structure may be stamped (and, if the honeycomb structure 200 is formed of a plurality of individual segments as shown in, e.g., FIGS. 3A and 4A, the stamped pieces may be bonded together (e.g., laser welded together) to form the honeycomb structure 200). Plastic honeycomb structures may be formed by extrusion or injection molding. Films/fiber honeycomb structures may be also be formed by extrusion or injection molding. In some embodiments, if the honeycomb structure 200 is a single piece, the entire honeycomb structure 200 may be molded/extruded as a single piece. In some embodiments, the honeycomb structure 200 may be molded/extruded to the desired size or cut from a larger molded/extruded honeycomb structure 200. In some embodiments, molded/extruded pieces may be attached to each other through an adhesive). Additionally, the plurality of hexagonal cells 201 may be arranged in a shape that corresponds to the arrangement of the plurality of battery cells 103 in the battery module (e.g., a rectangular grid). For example, in FIG. 2B, a line passing through the ends of the vertical walls on the top of FIG. 2B (e.g., adjacent to sidewall 207) may be considered the top side of the rectangle and a line running through the leftmost vertical segments on the left side of FIG. 2B (e.g., adjacent to sidewall 205) may be considered the left side of the rectangle. Put another way, edges 211a, 211b, 211c, and 211d of the honeycomb structure 200 form a substantially rectangular shape.

As shown, the hexagonal geometry of the hexagonal cells 201 may allow the battery cells 103 (e.g., cylindrical battery cells) to be very closely packed as the thin walls of the hexagonal cells may be configured to fit between adjacent battery cells 103 during assembly of the battery module. Further, the hexagonal geometry may allow for more relaxed tolerance requirements in the battery module, which may allow the honeycomb structure 200 to be manufactured by manufacturing methods (e.g., injection molding) that would not otherwise be able to be cheaply implemented with tighter tolerance requirements.

Additionally, in some embodiments, the hexagonal geometry of the hexagonal cells 201 may provide structure to the battery cells 103 on six line load interfaces (e.g., one per side of the hexagonal cell shape), while still allowing the battery cells 103 to expand and contract during charging and discharging. Further, the hexagonal geometry of the hexagonal cells 201 may provide structure to a swelling battery cell 103 (e.g., undergoing a thermal event) and protect neighboring battery cells 103.

In some embodiments, battery cells 103 along the edges of the battery module (e.g., adjacent to sidewalls 205 and 207) may not be fully surrounded by a hexagonal cell 201. However, in some embodiments, it may be advantageous to provide partial hexagonal cells 203 one or more edges (e.g., 215a-215d) of the honeycomb structure 200. For example, as shown, partial hexagonal cells 203 are configured to be arranged around a partial middle section (e.g., by four or fewer sidewall portions) of battery cells 103 adjacent to sidewall 207 (e.g., the partial hexagonal cells 203 partially encapsulates or partially encloses a portion of a battery cell 103).

In some embodiments, it may be advantageous to provide rounded vertices 209 on each of the plurality of hexagonal cells 201, as shown in FIG. 2B, in order to facilitate assembly of the battery module. For example, the rounded vertices 209 may facilitate insertion of the honeycomb structure 200 into the free space between the plurality of battery cells 103 during assembly of the battery module (e.g., by enabling corners of the honeycomb structure to slide between battery cells 103 more easily).

Although the honeycomb structure 200 is shown as a single piece, in some embodiments, it may be advantageous to provide a segmented honeycomb structure comprising a plurality of independent (separate) segments, as discussed below with reference to FIGS. 3A-5B.

Figure 3A:
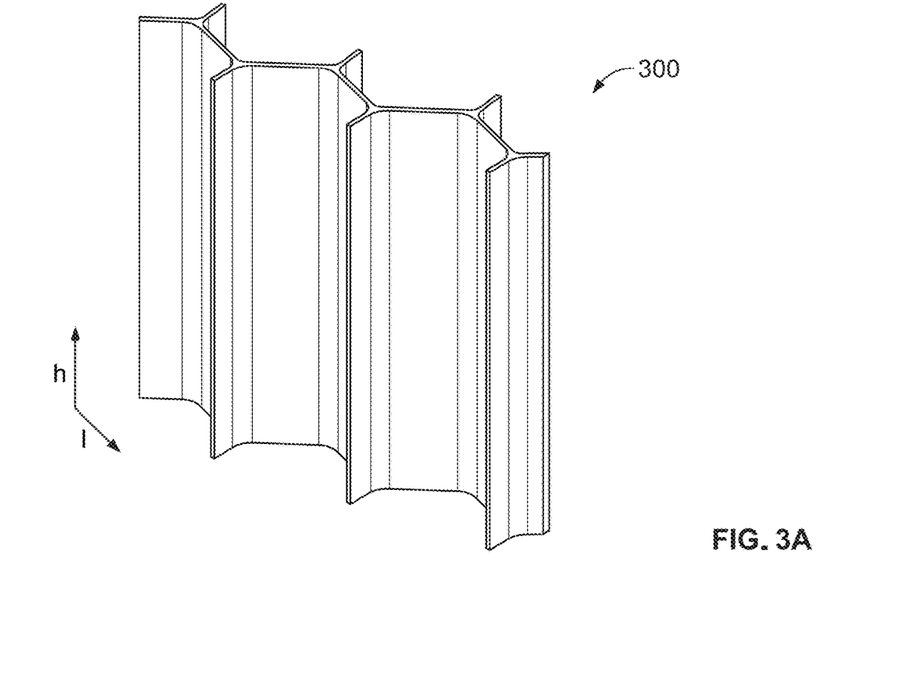
FIG. 3A shows a perspective view of a honeycomb segment, in accordance with some embodiments of the present disclosure.
Figure 3B:
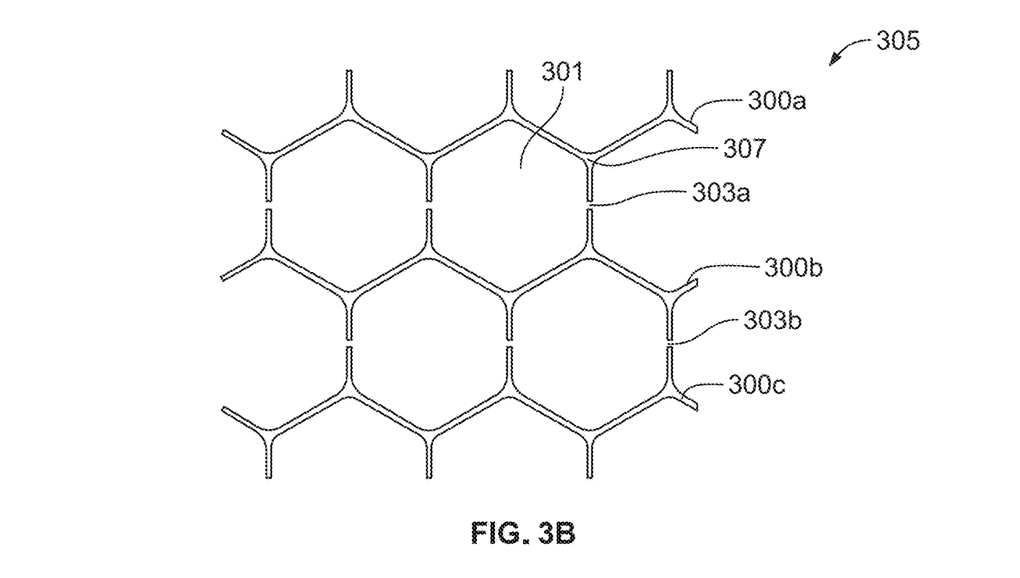
FIG. 3B shows a top view of a segmented honeycomb structure comprising a plurality of the honeycomb segments of FIG. 3A, in accordance with some embodiments of the present disclosure.
Figure 3C:
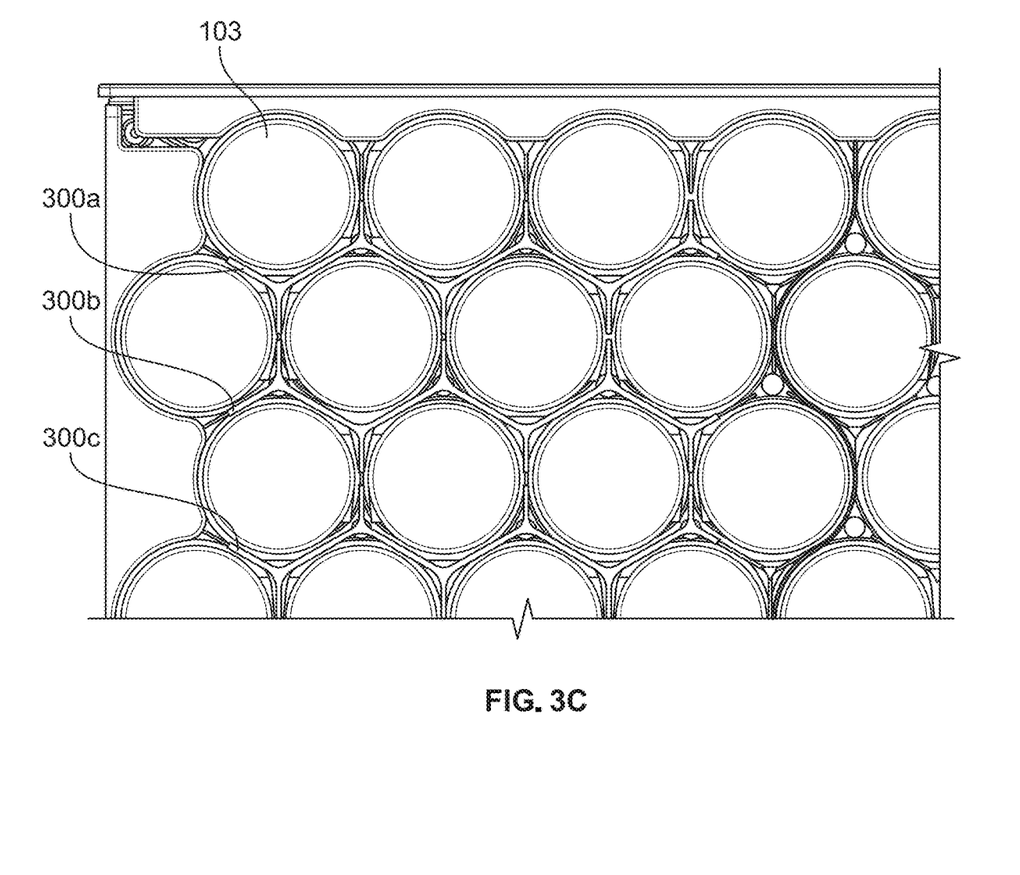
FIG. 3C shows a partial top view of the segmented honeycomb structure of FIG. 3B, after insertion of the segmented honeycomb structure in the battery module assembly of FIG. 1, in accordance with some embodiments of the present disclosure.

FIG. 3A shows a perspective view of a honeycomb segment 300, and FIG. 3B shows a top view of a segmented honeycomb structure 305 comprising a plurality of the honeycomb segments 300, in accordance with some embodiments of the present disclosure. FIG. 3C shows a partial top view of the segmented honeycomb structure 305 of FIG. 3B, after insertion of the segmented honeycomb structure 305 in the battery module assembly of FIG. 1, in accordance with some embodiments of the present disclosure. As shown, the segmented honeycomb structure 305 comprises a plurality of the honeycomb segments 300a, 300b, 300c (collectively referred to as honeycomb segments 300). The honeycomb segments 300 may be arranged to form a plurality of hexagonal cells 301. For example, a subset of hexagonal cells 301 may be formed by adjacent pairs of the honeycomb segments 300. As shown, adjacent honeycomb segments 300 may be separated by gaps 303a and 303b (collectively referred to as gaps 303). In some embodiments, the average size of the gaps 303 may be adjusted depending on the requirements of the battery module (e.g., by adjusting the size of the honeycomb segments 300 relative to the size and arrangement of the plurality of battery cells 103). For example, larger gaps may provide more relaxed tolerance requirements in the battery module. In some embodiments, one or more of the honeycomb segments 300 may be attached to each other (e.g., through an adhesive). However, this is only an example, and it should be understood that none of the honeycomb segments 300 may be attached to each other.

In some embodiments, in order to better support the battery cells 103 in the battery module, portion 307 of the honeycomb segments 300 at the center point of three adjacent battery cells may be made thicker than other portions of the honeycomb segments 300. Although pairs of the honeycomb segments 300 are configured to form two hexagonal cells 301 (as well two partial hexagonal cells), it should be understood that the length of the honeycomb segments 300 may be adjusted for any suitable configuration. For example, as discussed below with reference to FIGS. 4A and 4B, pairs of honeycomb segments may be configured to form eight whole hexagonal cells and two partial hexagonal cells. Additionally, it should be understood that the honeycomb segments 300 may be also be arranged in a lengthwise direction, in order to accommodate battery modules of different dimensions.

Figure 4A:
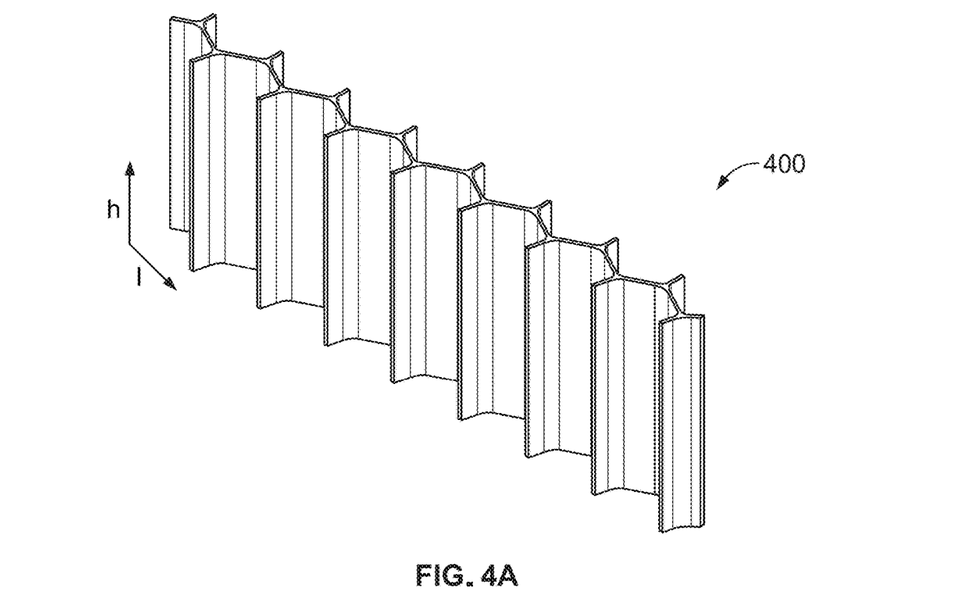
FIG. 4A shows a perspective view of a honeycomb segment, in accordance with some embodiments of the present disclosure.
Figure 4B:
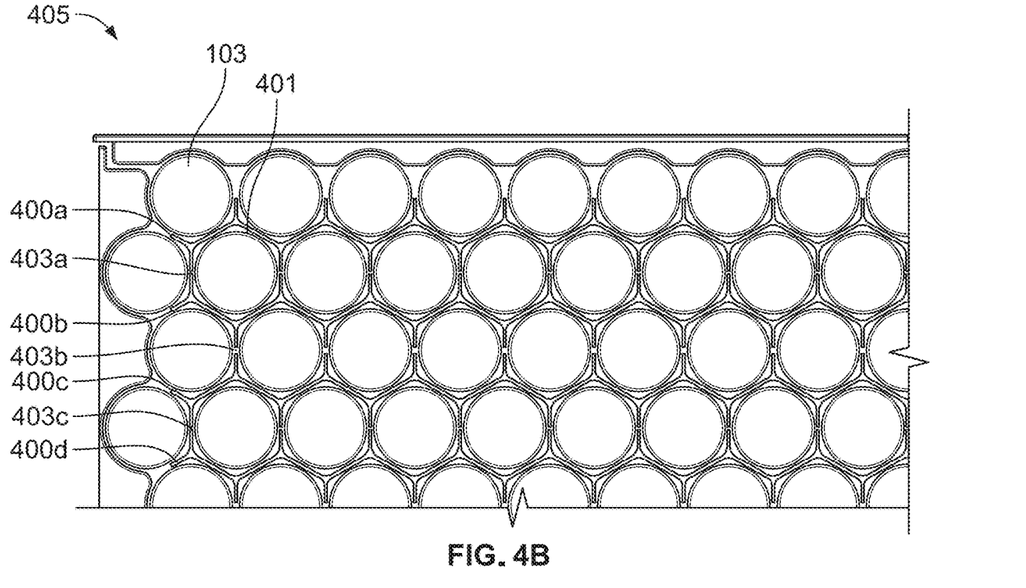
FIG. 4B shows a partial top view of a segmented honeycomb structure comprising a plurality of the honeycomb segments of FIG. 4A, after insertion of the segmented honeycomb structure in the battery module assembly of FIG. 1, in accordance with some embodiments of the present disclosure.

FIG. 4A shows a perspective view of a honeycomb segment 400 and FIG. 4B shows a partial top view of a segmented honeycomb structure 405 comprising a plurality of the honeycomb segments of 400, after insertion of the segmented honeycomb structure 405 in the battery module assembly of FIG. 1, in accordance with some embodiments of the present disclosure. As shown, the segmented honeycomb structure 405 may be similar to the segmented honeycomb structure 305 illustrated in FIGS. 3A-3C, except that each honeycomb segment 400 may be longer than each honeycomb segment 300 (e.g., in the lengthwise direction, "l"). For example, as shown, each pair of different segments may form seven whole hexagonal cells 401 and two partial hexagonal cells (e.g., at each end in a longitudinal direction). However, these are only examples, and the segmented honeycomb structure 405 may be divided into any number of segments in any direction, depending on the specific requirements of the battery module (e.g., and the arrangement of the plurality of battery cells 103). As shown, the honeycomb segments 400*a*, 400*b*, 400*c*, and 400*d* may be separated by gaps 403*a*, 403*b*, and 403*c*, as similarly described above with reference to FIGS. 3A-3C.

Figure 5A:
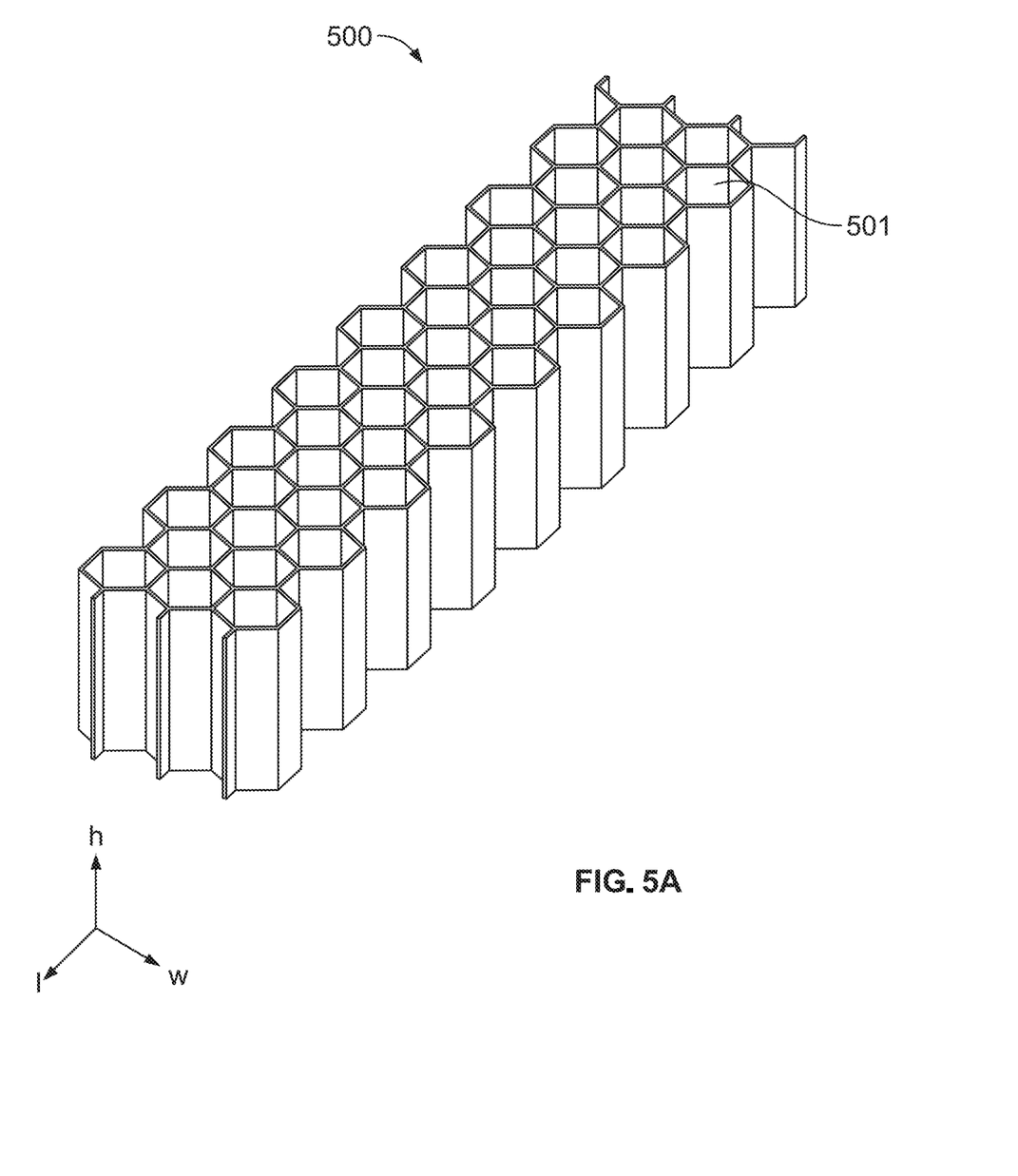
FIG. 5A shows a perspective view of a honeycomb structure, in accordance with some embodiments of the present disclosure.
Figure 5B:
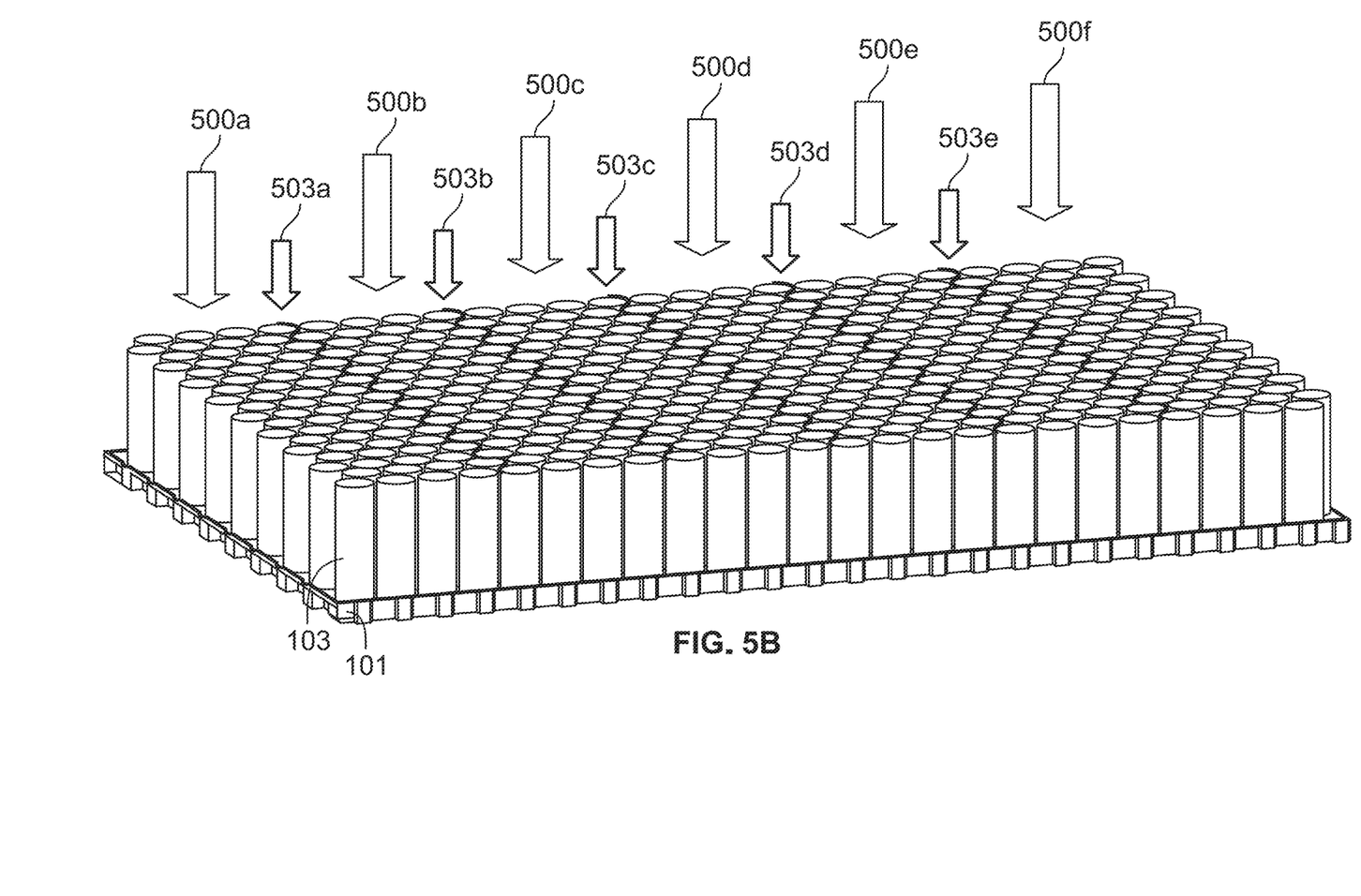
FIG. 5B shows a perspective view of a battery module after insertion of the honeycomb structure of FIG. 5A in the battery module assembly, in accordance with some embodiments of the present disclosure.

FIG. 5A shows a perspective view of a honeycomb structure 500, in accordance with some embodiments of the present disclosure. FIG. 5B shows a perspective view of a battery module after insertion of the honeycomb structure 500 in the battery module assembly, in accordance with some embodiments of the present disclosure. In some embodiments, the battery module may include a plurality of groups of battery cells 103 operating at different voltages (e.g., connected to each other by at least one current collector assembly including at least one busbar). In this case, it may be advantageous to insert barrier layers 503*a*-503*b* (collectively referred to as barrier layers 503) between groups of the battery cells 103 operating at different voltages (e.g., between parallel groups). In some embodiments, the barrier layers 503 may provide electrical insulation in the event that the position of any of the plurality of battery cells 103 shifts. In some embodiments, the barrier layers 503 may comprise a fire-resistant material to prevent to reduce or prevent the propagation of a thermal event within the battery module. However, the barrier layers 503 may prevent a single honeycomb structure (e.g., the honeycomb structure 200 of FIG. 2A) from being used for the entire battery module. Accordingly, in some embodiments, it may be advantageous to provide a separate honeycomb structure 500*a*-500*b* (collectively referred to as honeycomb structures 500) for each group of battery cells 103. For example, as the battery module shown in FIG. 5B includes six groups of battery cells 103, six separate honeycomb structures 500 can be inserted into the battery module assembly. As shown, each honeycomb structure 500 may include a plurality of hexagonal cells 501, as similarly described above with reference to FIGS. 2A and 2B. Although a single-piece honeycomb structure 500 is shown as being provided for each group of battery cells 103, it should be understood that honeycomb structures for each group of battery cells 103 may be implemented by the segmented honeycomb structures (e.g., 305 and 405) discussed above with reference to FIGS. 3A-4B.

Figure 6:
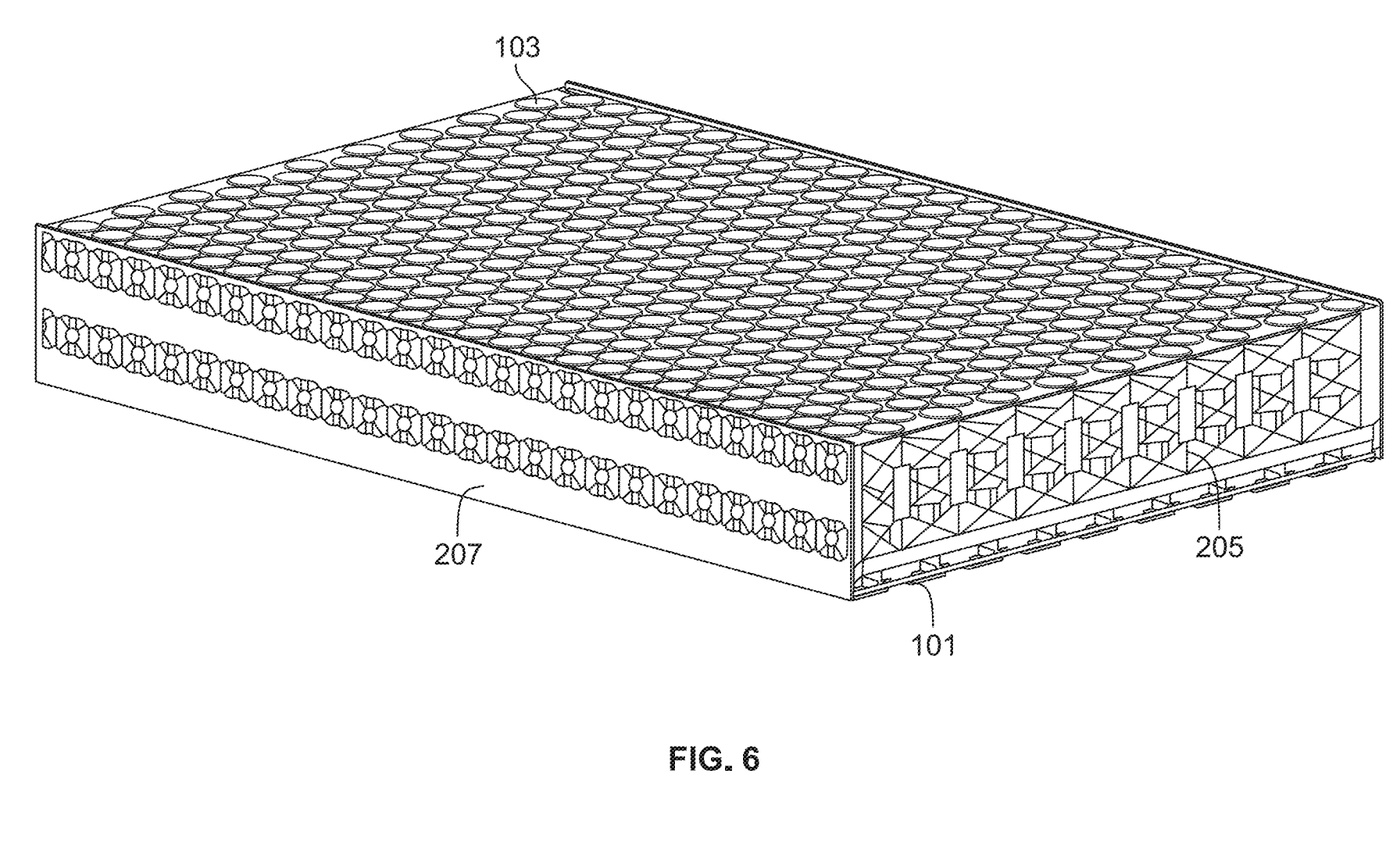
FIG. 6 shows a battery module assembly following the insertion of any of the honeycomb structures of FIGS. 2A-5B, and the addition of sidewalls, in accordance with some embodiments.

FIG. 6 shows a battery module assembly following the insertion of any of the honeycomb structures of FIGS. 2A-5B, and the addition of sidewalls 205 and 207, in accordance with some embodiments. As shown, the addition of the sidewalls 205 and 207 results in the plurality of battery cells 103 being incased on at least five sides (i.e., by the carrier layer 101 on one side, by the sidewalls 205 on two sides, and by sidewalls 207 on two sides). In some embodiments, the sidewalls 205 and 207 are attached to the battery module assembly by an adhesive.

Figure 7:
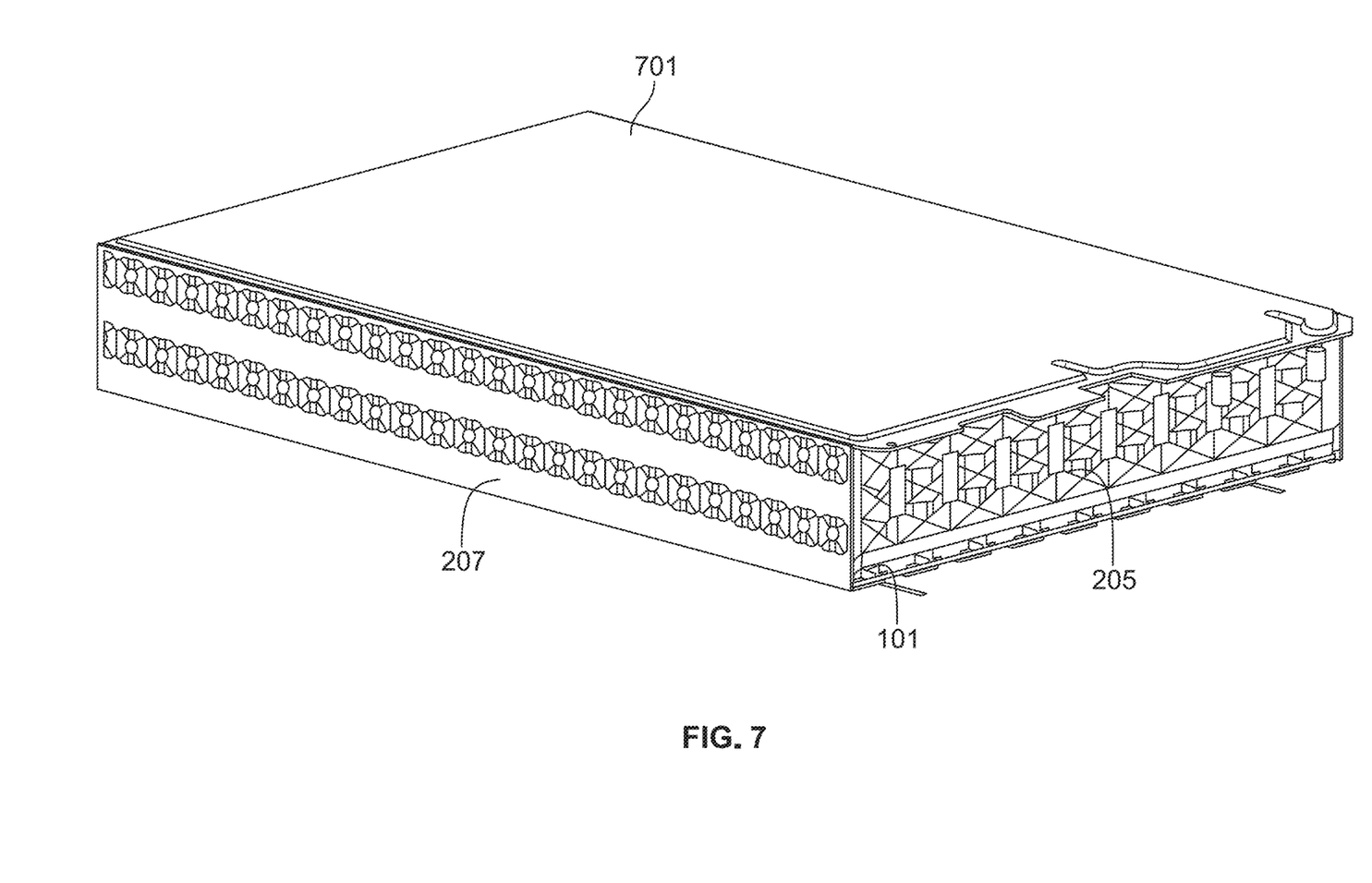
FIG. 7 shows the battery module assembly of FIG. 6 following the installation of a cooling plate, in accordance with some embodiments of the present disclosure.

FIG. 7 shows the battery module assembly of FIG. 6 following the installation of a cooling plate 701, in accordance with some embodiments of the present disclosure. In some embodiments, the cooling plate 701 may be coupled to the exposed ends 107 of the plurality of battery cells 103 by an adhesive (e.g., a thermal interface material).

In some embodiments, the thermal transfer plate may be used to selectively heat or cool the battery module assembly. In some embodiments, the components described above may form a first battery submodule that may be combined with a second battery submodule similar to the first battery submodule. For example, the first and second battery submodules may be formed on opposite sides of the cooling plate 701.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An intercellular structure for a battery module, the intercellular structure comprising:
   a honeycomb structure comprising a plurality of separated honeycomb segments forming a plurality of hexagonal cells therebetween, wherein:
   adjacent segments of the plurality of separated honeycomb segments have gaps between pairs of extensions of the adjacent segments that form sidewalls of the plurality of hexagonal cells;
   each of the gaps between a pair of adjacent segments is aligned along an axis;
   each of the plurality of hexagonal cells has an open-ended top and an open-ended bottom; and
   each of the plurality of hexagonal cells is configured to be arranged around a middle section of one of a plurality of battery cells.

2. The intercellular structure of claim 1, wherein the plurality of battery cells is arranged in a close-hex-pack configuration.

3. The intercellular structure of claim 1, wherein edges of the honeycomb structure form a rectangular shape.

4. The intercellular structure of claim 3, wherein:
   the honeycomb structure further comprises a plurality of partial hexagonal cells forming a first edge of the rectangular shape;

each of the plurality of partial hexagonal cells comprises fewer than five sidewall portions arranged in a partial hexagon shape; and each of the plurality of partial hexagonal cells has an open-ended top and open-ended bottom and is configured to be arranged around a portion of middle section of one of the plurality of battery cells.

5. The intercellular structure of claim 1, wherein vertices of each of the plurality of hexagonal cells are rounded.

6. The intercellular structure of claim 1, wherein the honeycomb structure comprises a meta-aramid fiber material or a ceramic fiber paper material.

7. The intercellular structure of claim 1, wherein the honeycomb structure comprises a plastic material, a rubber material, a silicone material, or a metal material.

8. The intercellular structure of claim 1, wherein:

each pair of extensions forms a respective sidewall having one of the gaps in a middle of the respective sidewall; and respective extensions of each of the adjacent honeycomb segments of the plurality of separated honeycomb segments form a respective gap such that each hexagonal cell of the plurality of hexagonal cells has at least one respective opening corresponding to each respective gap.

9. The intercellular structure of claim 1, wherein:

the plurality of battery cells comprises a first group of cylindrical battery cells and a second group of cylindrical battery cells;

the honeycomb structure comprises a first honeycomb structure and a second honeycomb structure, the first honeycomb structure and the second honeycomb structure being separate structures;

the first honeycomb structure comprises a first plurality of hexagonal cells, each configured to be arranged around a cylindrical middle section of one of the first group of cylindrical battery cells; and the second honeycomb structure comprises a second plurality of hexagonal cells, each configured to be arranged around a middle section of one of the second group of cylindrical battery cells.

10. The intercellular structure of claim 9, wherein:

each of the first group of cylindrical battery cells are connected in parallel with each other;

each of the second group of cylindrical battery cells are connected in parallel with each other; and the first group of cylindrical battery cells is separated from the second group of cylindrical battery cells by a barrier layer.

11. A battery module comprising:

a plurality of battery cells arranged in a predetermined pattern; and a honeycomb structure comprising a plurality of separated honeycomb segments forming a plurality of hexagonal cells therebetween, wherein:

adjacent segments of the plurality of separated honeycomb segments have gaps between pairs of extensions of the adjacent segments that form sidewalls of the plurality of hexagonal cells;

each of the gaps between a pair of adjacent segments is aligned along an axis;

each of the plurality of hexagonal cells has an open-ended top and an open-ended bottom; and each of the plurality of hexagonal cells is configured to be arranged around a middle section of one of the plurality of battery cells.

12. The battery module of claim 11, wherein the predetermined pattern is a close-hex-pack configuration.

13. The battery module of claim 11, wherein edges of the honeycomb structure form a rectangular shape.

14. The battery module of claim 13, wherein:

each pair of extensions forms a respective sidewall having one of the gaps in a middle of the respective sidewall;

the honeycomb structure further comprises a plurality of partial hexagonal cells forming a first edge of the rectangular shape;

each of the plurality of partial hexagonal cells comprises fewer than five sidewall portions arranged in a partial hexagon shape; and each of the plurality of partial hexagonal cells has an open-ended top and open-ended bottom and is configured to be arranged around a portion of middle section of one of the plurality of battery cells.

15. The battery module of claim 11, wherein vertices of each of the plurality of hexagonal cells are rounded.

16. The battery module of claim 11, wherein:

the plurality of battery cells comprises a first group of cylindrical battery cells and a second group of cylindrical battery cells;

the honeycomb structure comprises a first honeycomb structure and a second honeycomb structure, the first honeycomb structure and the second honeycomb structure being separate structures;

the first honeycomb structure comprises a first plurality of hexagonal cells, each configured to be arranged around a cylindrical middle section of one of the first group of cylindrical battery cells; and the second honeycomb structure comprises a second plurality of hexagonal cells, each configured to be arranged around a middle section of one of the second group of cylindrical battery cells.

17. The battery module of claim 16, further comprising a barrier layer, wherein:

each of the first group of cylindrical battery cells are connected in parallel with each other;

each of the second group of cylindrical battery cells are connected in parallel with each other; and the first group of cylindrical battery cells is separated from the second group of cylindrical battery cells by the barrier layer.

18. A method of assembling a battery module, the method comprising:

providing a plurality of battery cells;

arranging the plurality of battery cells into a close-hex-pack configuration;

providing a honeycomb structure comprising a plurality of separated honeycomb segments having a plurality of hexagonal cells therebetween, each of the plurality of hexagonal cells having an open-ended top and an open-ended bottom; and arranging each of the plurality of hexagonal cells around a middle section of one of the plurality of battery cells, wherein;

adjacent segments of the plurality of separated honeycomb segments have gaps between pairs of extensions of the adjacent segments that form sidewalls of the plurality of hexagonal cells; and each pair of extensions forms a respective sidewall having one of the gaps in a middle of the respective sidewall.

19. The method of claim 18, wherein arranging the plurality of battery cells into the close-hex-pack configuration comprises arranging the plurality of battery cells into the close-hex-pack configuration on a first side of a carrier layer.

20. The method of claim 19, wherein arranging each of the plurality of hexagonal cells around the middle section of one of the plurality of battery cells comprises inserting the honeycomb structure in free space between the plurality of battery cells from the first side of the carrier layer.

\* \* \* \* \*